United States Patent
Ye et al.

(10) Patent No.: US 11,915,439 B2
(45) Date of Patent: Feb. 27, 2024

(54) METHOD AND APPARATUS OF TRAINING DEPTH ESTIMATION NETWORK, AND METHOD AND APPARATUS OF ESTIMATING DEPTH OF IMAGE

(71) Applicant: Beijing Baidu Netcom Science Technology Co., Ltd., Beijing (CN)

(72) Inventors: Xiaoqing Ye, Beijing (CN); Hao Sun, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 287 days.

(21) Appl. No.: 17/353,634

(22) Filed: Jun. 21, 2021

(65) Prior Publication Data

US 2021/0312650 A1    Oct. 7, 2021

(30) Foreign Application Priority Data

Dec. 18, 2020   (CN) .......................... 202011513854.1

(51) Int. Cl.
| | |
|---|---|
| *G06K 9/00* | (2022.01) |
| *G06N 3/08* | (2023.01) |
| *G06T 7/174* | (2017.01) |
| *G06T 7/55* | (2017.01) |
| *G06T 7/70* | (2017.01) |
| *G06T 11/60* | (2006.01) |

(52) U.S. Cl.
CPC .............. *G06T 7/55* (2017.01); *G06N 3/08* (2013.01); *G06T 7/174* (2017.01); *G06T 7/70* (2017.01); *G06T 11/60* (2013.01); *G06T 2207/20081* (2013.01); *G06T 2207/20084* (2013.01)

(58) Field of Classification Search
CPC ..................................................... G06V 20/58
See application file for complete search history.

(56) References Cited

U.S. PATENT DOCUMENTS 10,769,848 B1 *   9/2020   Wang ..................... G06T 17/20
11,537,811 B2 *  12/2022   Shen .................... G05D 1/0251
(Continued)

OTHER PUBLICATIONS

European Extended Search Report, issued in the corresponding European patent application No. 21180599.9, dated Dec. 20, 2021, 8 pages.

(Continued)

*Primary Examiner* — Hadi Akhavannik
(74) *Attorney, Agent, or Firm* — Hamre, Schumann, Mueller & Larson, P.C.

(57) ABSTRACT

The present disclosure provides a method of training a depth estimation network, which relates to fields of computer vision, deep learning, and image processing technology. The method includes: performing a depth estimation on an original image by using a depth estimation network, so as to obtain a depth image for the original image; removing a moving object from the original image so as to obtain a preprocessed image for the original image; estimating a pose based on the original image and modifying the pose based on the preprocessed image; and adjusting parameters of the depth estimation network according to the original image, the depth image and the pose modified. The present disclosure further provides an apparatus of training a depth estimation network, a method and apparatus of estimating a depth of an image, an electronic device, and a storage medium.

13 Claims, 7 Drawing Sheets

(56) References Cited

U.S. PATENT DOCUMENTS

2019/0139179 A1*  5/2019  Wang .................... G06T 3/0093
2019/0340435 A1* 11/2019  Rabinovich .......... G06V 10/764
2020/0175326 A1*  6/2020  Shen .................... G05D 1/0253

OTHER PUBLICATIONS

Luo et al., "Consistent Video Depth Estimation", ACM Trans Graph, vol. 39, No. 4, Article 71, Jul. 2020, 13 pages.

\* cited by examiner

METHOD AND APPARATUS OF TRAINING DEPTH ESTIMATION NETWORK, AND METHOD AND APPARATUS OF ESTIMATING DEPTH OF IMAGE

CROSS-REFERENCE TO RELATED APPLICATION(S)

This application claims priority to the Chinese Patent Application No. 202011513854.1, filed on Dec. 18, 2020, which is incorporated herein by reference in its entirety.

TECHNICAL FIELD

The present disclosure relates to a field of artificial intelligence technology, and in particular to fields of computer vision, deep learning, and image processing technology. More specifically, the present disclosure provides a method and apparatus of training a depth estimation network, a method and apparatus of estimating a depth of an image, an electronic device, and a storage medium.

BACKGROUND

Image depth estimation is an indispensable technology in the field of computer vision, which is widely used in various scenarios such as video special effects, mixed reality, assisted driving, and so on.

At present, a neural network for depth estimation may be trained based on a large number of sample images captured by cameras. The neural network trained may then be used to estimate depth information of an image so as to achieve the depth estimation of the image. However, a moving object in the image may affect a training accuracy of the neural network, resulting in inaccurate estimation for the image depth information by the neural network.

SUMMARY

The present disclosure provides a method and apparatus of training a depth estimation network, a method and apparatus of estimating a depth of an image, an electronic device, and a storage medium.

According to a first aspect, there is provided a method of training a depth estimation network, including: performing a depth estimation on an original image by using a depth estimation network, so as to obtain a depth image for the original image; removing a moving object from the original image so as to obtain a preprocessed image for the original image; estimating a pose based on the original image and modifying the pose based on the preprocessed image; and adjusting parameters of the depth estimation network according to the original image, the depth image and the pose modified.

According to a second aspect, there is provided a method of estimating a depth of an image, including: acquiring an image to be estimated; and performing a depth estimation on the image to be estimated, by using a depth estimation network, so as to obtain a depth image for the image to be estimated.

According to a third aspect, there is provided an apparatus of training a depth estimation network, including: a first estimation module configured to perform a depth estimation on an original image by using a depth estimation network, so as to obtain a depth image for the original image; a removing module configured to remove a moving object from the original image so as to obtain a preprocessed image for the original image; a processing module configured to estimate a pose based on the original image and modify the pose based on the preprocessed image; and an adjustment module configured to adjust parameters of the depth estimation network according to the original image, the depth image and the pose modified.

According to a fourth aspect, there is provided an apparatus of estimating a depth of an image, including: an acquisition module configured to acquire an image to be estimated; and a second estimation module configured to perform a depth estimation on the image to be estimated, by using a depth estimation network, so as to obtain a depth image for the image to be estimated.

According to a fifth aspect, there is provided an electronic device, including: at least one processor; and a memory communicatively connected to the at least one processor, wherein the memory stores instructions executable by the at least one processor, and the instructions, when executed by the at least one processor, cause the at least one processor to implement the method provided by the present disclosure.

According to a sixth aspect, there is provided a non-transitory computer-readable storage medium having computer instructions stored thereon, wherein the computer instructions allow a computer to implement the method provided by the present disclosure.

According to a seventh aspect of the present disclosure, there is provided a computer program product containing computer programs/instructions that, when executed by a processor, cause the processor to implement the method provided by the present disclosure.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The drawings are used to better understand the solution and do not constitute a limitation to the present disclosure.

DETAILED DESCRIPTION OF EMBODIMENTS

The exemplary embodiments of the present disclosure are described below with reference to the drawings, which include various details of the embodiments of the present disclosure to facilitate understanding, and which should be considered as merely illustrative. Therefore, those ordinary skilled in the art should realize that various changes and modifications may be made to the embodiments described herein without departing from the scope and spirit of the present disclosure. In addition, for clarity and conciseness, descriptions of well-known functions and structures are omitted in the following description.

At present, a neural network for depth estimation, that is, a depth estimation network, may be trained based on a large number of sample images captured by cameras. The depth estimation network may then be used to estimate depth information of an image to be estimated, so as to achieve the depth estimation for the image. The training of the depth estimation network may be unsupervised training.

Unsupervised depth estimation training mainly includes two methods. One is to estimate, for adjacent frames in a set of images captured by a monocular camera, image depths and a pose between a previous frame and a next frame, then remap images based on the image depths and the pose, and guide the network training according to an error of the remapped images. The other is to learn a disparity map, based on a set of images captured by cameras, by predicting left and right consistency between the disparity map of left and right binocular images in the set of images and a disparity, and then calculate a depth value according to a baseline and a focal length of the cameras.

However, the method of estimating based on the pose between the previous frame and the next frame is easily affected by a moving object, which leads to inaccurate pose estimation, and then affects a calculation of remapping error. The binocular video-based method needs an additional camera, so that a complexity of calculation is increased. In addition, calibration and modification accuracy of left and right binocular cameras may also affect the accuracy of the depth estimation.

Figure 1:
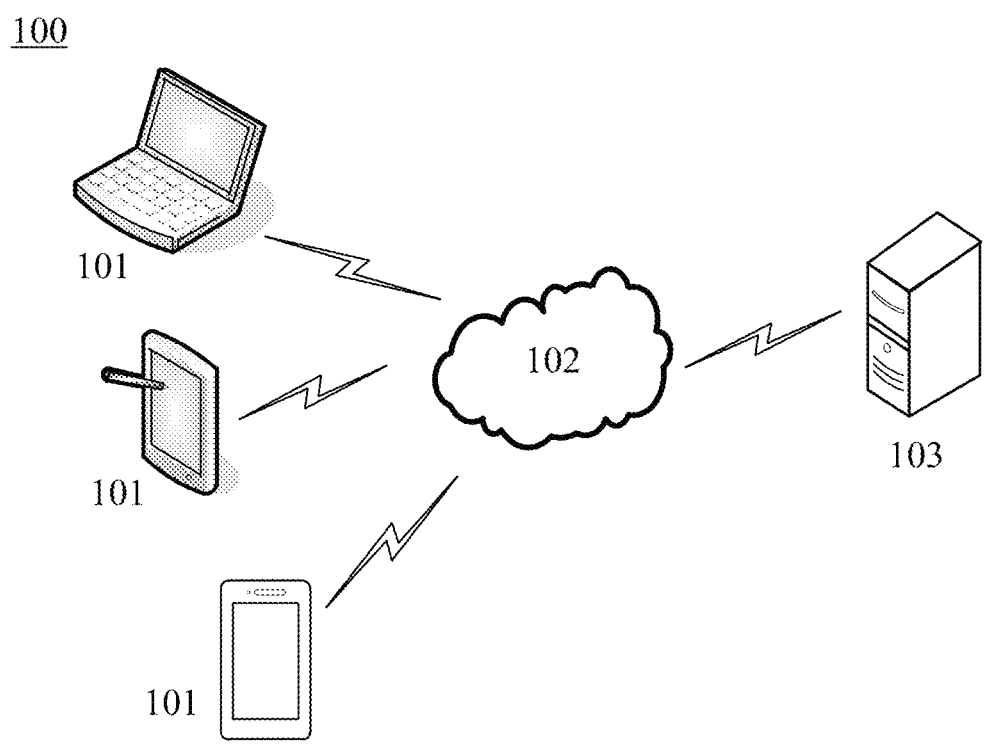
FIG. 1 shows an exemplary system architecture to which a method and apparatus of training a depth estimation network and a method and apparatus of estimating a depth of an image may be applied according to an embodiment of the present disclosure.

FIG. 1 shows an exemplary system architecture 100 to which a method and apparatus of training a depth estimation network and a method and apparatus of estimating a depth of an image may be applied according to an embodiment of the present disclosure. It should be noted that FIG. 1 is only an example of a system architecture to which the embodiments of the present disclosure may be applied, so as to help those skilled in the art to understand the technical content of the present disclosure. It does not mean that the embodiments of the present disclosure may not be applied to other apparatuses, systems, environments or scenes.

As shown in FIG. 1, the system architecture 100 according to the embodiment may include a plurality of terminal devices 101, a network 102, and a server 103. The network 102 is used to provide a medium for a communication link between the terminal devices 101 and the server 103. The network 102 may include various connection types, such as wired or wireless communication links, and so on.

The terminal devices 101 may be various electronic devices, including but not limited to smart phones, tablet computers, laptop computers, and so on. The server 103 may be an electronic device with certain data processing and computing capabilities, and may provide a service support for the terminal devices 101.

Exemplarily, the server 103 is used to train the depth estimation neural network according to a set of sample images, specifically to estimate, for adjacent frames in the set of images, image depths and a pose between a previous frame and a next frame, then remap images through the image depths and the pose, and guide the network training according to an error of the remapped images, so as to obtain the trained depth estimation network.

Exemplarily, a user may interact with the server 103 through the terminal device 101. For example, the user uploads an image to be estimated through the terminal device 101, and the terminal device 101 transmits the image to be estimated to the server 103. The server 103 performs a depth estimation on the image to be estimated, by using the trained depth estimation network, so as to obtain depth information of the image to be estimated. Then, a depth image for the image to be estimated is generated and transmitted to the terminal device 101 via the network 102.

Figure 2:
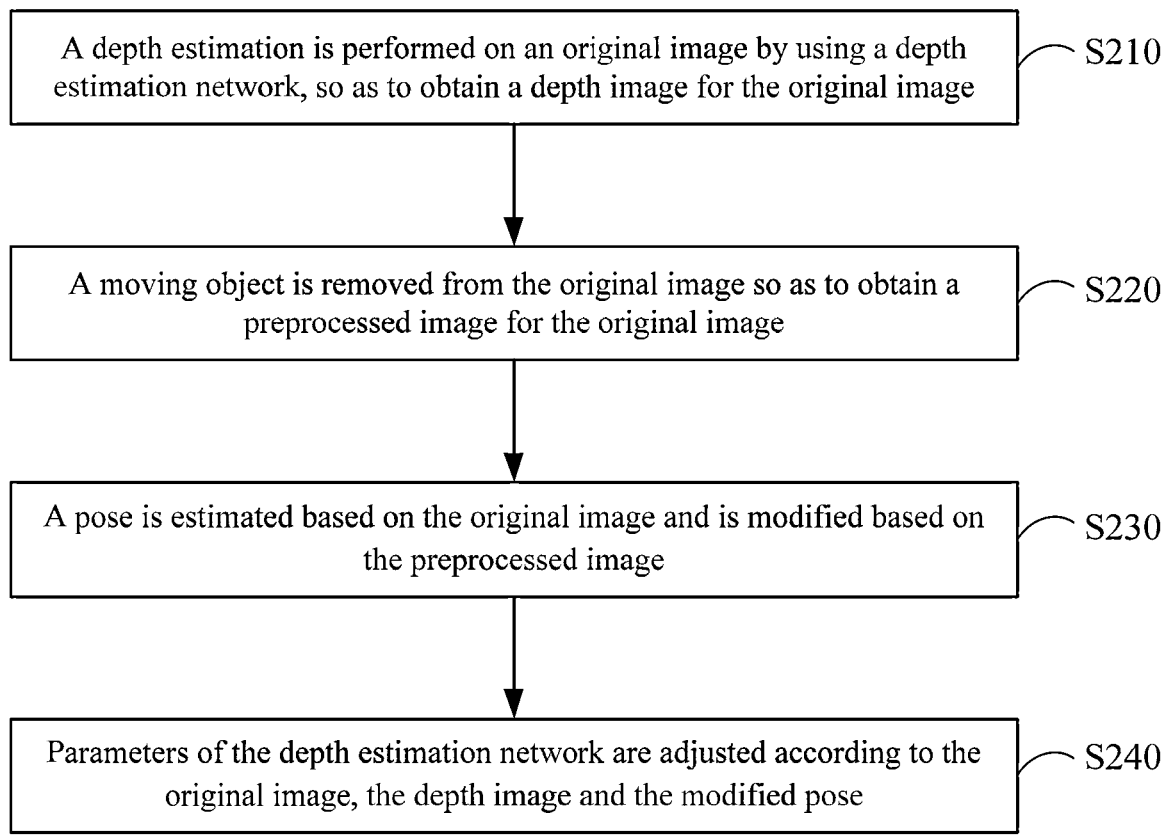
FIG. 2 shows a flowchart of a method of training a depth estimation network according to an embodiment of the present disclosure.

FIG. 2 shows a flowchart of a method of training a depth estimation network according to an embodiment of the present disclosure.

As shown in FIG. 2, a method 200 of training a depth estimation network may include operation S210 to operation S240.

In operation S210, a depth estimation is performed on an original image by using the depth estimation network, so as to obtain a depth image for the original image.

According to the embodiments of the present disclosure, the original image may include two adjacent frames of consecutive images in a video, which may be referred to as a first original image and a second original image. The second original image may be a next frame to the first original image or a previous frame of the first original image. The depth estimation network may estimate the depth information of the first original image and the depth information of the second original image, then generate a depth image for the first original image based on the depth information of the first original image, and generate a depth image for the second original image based on the depth information of the second original image.

In step S220, a moving object is removed from the original image so as to obtain a preprocessed image for the original image.

According to the embodiments of the present disclosure, the pose between the two adjacent frames of images may be estimated based on position coordinate information for each pixel in the first original image and position coordinate information for each pixel in the second original image. The first original image and the second original image may contain roads, trees, pedestrians, vehicles and other objects. A moving object such as pedestrians, vehicles and riders may cause an inaccurate estimation for the pose between the first original image and the second original image. Therefore, the moving object in the first original image and the moving object in the second original image may be removed to obtain the preprocessed image for the first original image and the preprocessed image for the second original image. It may be understood that the preprocessed image for the first original image in which the moving object in the first original image is removed and the preprocessed image for the second original image in which the moving object in the second original image is removed may be used for a subsequent modification for the pose so as to improve the accuracy of the pose estimation.

Exemplarily, the first original image and the second original image each may be segmented by using a segmentation network. The segmentation network may segment objects in the first original image and objects in the second original image respectively into different regions, so as to obtain a segmented image for the first original image and a segmented image for the second original image. For example, the first original image contains four objects, including a road, a tree, a pedestrian and a vehicle. The segmentation network may segment the first original image into four regions respectively containing the road, the tree, the pedestrian and the vehicle. The second original image may be segmented in a similar manner, which will not be repeated here. It should be noted that since the first original image and the second original image are adjacent frames of images, the first original image and the second original image may contain the same objects.

In operation S230, a pose is estimated based on the original image and is modified based on the preprocessed image.

According to the embodiments of the present disclosure, an initial pose between the first original image and the second original image may be estimated using a pose estimation network. The pose estimation network may be a neural network for pose estimation, trained by a large number of sample images. Because the first original image and the second original image each contains a moving object, the pose estimated by the pose estimation network based on the first original image and the second original image may be inaccurately estimated due to the influence of the moving object. In the preprocessed image for the first original image and the preprocessed image for the second original image, the moving object is removed. Therefore, the initial pose may be modified by using the preprocessed image for the first original image and the preprocessed image for the second original image, so as to obtain a more accurate pose.

Specifically, the coordinate information for each pixel in the preprocessed image for the first original image mapped to a three-dimensional space may be calculated based on the position coordinates for the each pixel in the preprocessed image for the first original image, the depth information of the depth image for the first original image, and a conversion relationship between the camera and the pixel coordinates, so as to obtain a point cloud set of the preprocessed image for the first original image. The coordinate information for each pixel in the preprocessed image for the second original image mapped in the three-dimensional space may be calculated based on the position coordinates for the each pixel in the preprocessed image for the second original image, the depth information of the depth image for the second original image, and a conversion relationship between the camera and the pixel coordinates, so as to obtain a point cloud set of the preprocessed image for the second original image. It may be understood that the coordinates for the pixel in the two-dimensional preprocessed image may be mapped to the three-dimensional space based on the depth image and the conversion relationship between the camera and the pixel coordinates, so as to obtain the three-dimensional coordinates for each pixel in the preprocessed image.

The pose may be recalculated through Iterative Closest Point (ICP) algorithm, based on the point cloud set of the preprocessed image for the first original image, the point cloud set of the preprocessed image for the second original image, and the initial pose, so as to obtain a modified pose.

In operation S240, parameters of the depth estimation network are adjusted according to the original image, the depth image and the modified pose.

According to the embodiments of the present disclosure, the second original image may be remapped based on the modified pose, the position information for the each pixel point in the second original image, and a depth information for each pixel in the depth image for the second original image, so as to obtain a projection image for the second original image. The projection image for the second original image should restore the first original image as much as possible. Therefore, a difference between the projection image and the first original image may be taken as a part of a loss of the depth estimation network. In addition, a gradient of the first original image and that of the depth image for the first original image should be consistent as far as possible. Therefore, a difference between the gradient of the first original image and that of the depth image for the first original image may also be taken as a part of the loss of the depth estimation network.

A total loss of the depth estimation network may be obtained based on the difference between the projection image and the first original image and the difference between the gradient of the first original image and the gradient of the depth image for the first original image. The parameters of the depth estimation network may be adjusted based on the total loss of the depth estimation network. Then, the operation S210 is performed on a further original image and the training process is repeated, until the total loss of the depth estimation network meets a preset cutoff condition. In this way, the trained depth estimation network is obtained.

According to the embodiments of the present disclosure, the depth estimation is performed on the original image by using the depth estimation network so as to obtain the depth image for the original image, the moving object is removed from the original image to obtain the preprocessed image for the original image, the pose is estimated based on the original image and is modified based on the preprocessed image, and the parameters of the depth estimation network are adjusted based on the original image, the depth image and the modified pose. Because the moving object is removed from the original image, the influence of the moving object on the network training may be reduced, so that the accuracy of the network training may be improved.

It may be understood that in the embodiments of the present disclosure, on the one hand, a more accurate pose estimation is guided by removing the moving object, so that the accuracy of the training of the depth estimation network is improved. On the other hand, by defining the gradient error between the first original image and the depth image for the first original image, a continuity of the depth of a region of the depth image where the same object is located is restricted, so that the depth information with higher robustness may be obtained.

Figure 3:
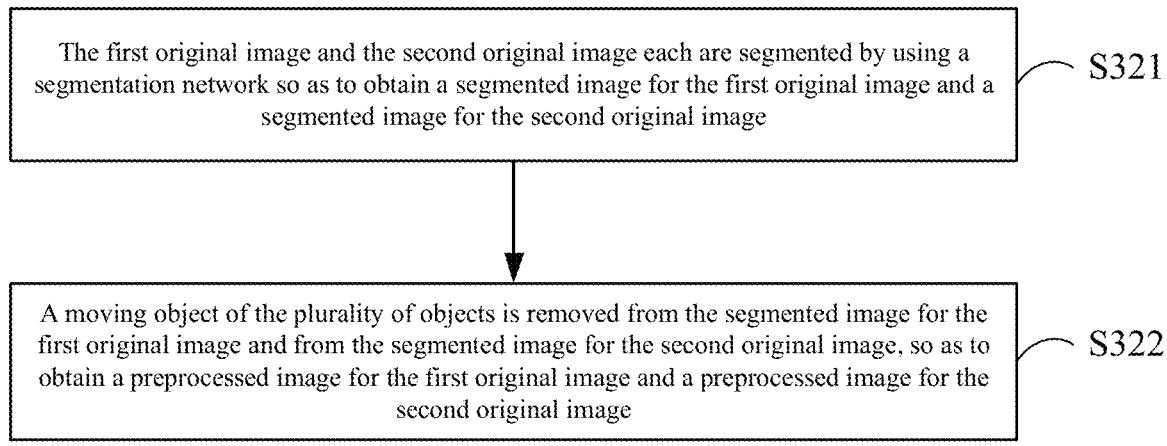
FIG. 3 shows a flowchart of a method of removing a moving object from an original image according to an embodiment of the present disclosure.

FIG. 3 shows a flowchart of a method of removing a moving object from an original image according to an embodiment of the present disclosure.

As shown in FIG. 3, the method includes operation S321 to operation S322.

In operation S321, the first original image and the second original image each are segmented by using a segmentation network so as to obtain a segmented image for the first original image and a segmented image for the second original image.

According to the embodiments of the present disclosure, the segmentation network may be a semantic segmentation network, and semantic objects corresponding to an image shooting scene may include roads, trees, pedestrians, vehicles, traffic lights, road signs, and so on. The segmented image for the first original image and the segmented image for the second original image each contain a plurality of semantic objects. For example, the first original image and the second original image each may obtain objects such as a road, a tree, a pedestrian, a vehicle, etc. The various objects may be segmented into different regions by using the semantic segmentation network, so as to obtain the segmented image for the first original image and the segmented image for the second original image. Exemplarily, the road, the tree, the pedestrian and the vehicle in the first original image are segmented into different regions by using the semantic segmentation network. The depth image for the first original image may include a region where the road is located, a region where the tree is located, a region where the pedestrian is located, and a region where the vehicle is located.

Specifically, the semantic segmentation network may be DeepLabV3+, PSPNet, Mask R-CNN, etc., which is not limited in the embodiments of the present disclosure.

In operation S322, a moving object of the plurality of objects is removed from the segmented image for the first original image and from the segmented image for the second original image, so as to obtain a preprocessed image for the first original image and a preprocessed image for the second original image.

According to the embodiments of the present disclosure, the moving objects such as a pedestrian, a vehicle and a rider in the segmented image for the first original image and the segmented image for the second original image may cause an inaccurate estimation for the pose between the first original image and the second original image. Therefore, the moving object in the segmented image for the first original image and the moving object in the segmented image for the second original image may be removed to obtain the preprocessed image for the first original image and the preprocessed image for the second original image. It may be understood that the preprocessed image for the first original image in which the moving object is removed and the preprocessed image for the second original image in which the moving object is removed may be used for the subsequent modification for the pose so as to improve the accuracy of the pose estimation.

According to the embodiments of the present disclosure, when the depth image for the first original image and the depth image for the second original image are estimated using the depth estimation network, in estimating the depth image for the first original image, the first original image and the segmented image for the first original image may be together used as an input of the depth estimation network, in order to improve the accuracy of the depth estimation. Because the various objects are segmented in the segmented image for the first original image, the influence between the various objects may be reduced, so that the depth image for the first original image output by the depth estimation network is more accurate. Similarly, in estimating the depth image for the second original image, the second original image and the segmented image for the second original image may be together used as an input of the depth estimation network, so that the depth image for the second original image output by the depth estimation network is more accurate.

According to the embodiments of the present disclosure, an initial pose between the first original image and the second original image estimated by using the pose estimation network may be referred to as $$\text{Pose} = \begin{bmatrix} R & t \\ 0 & 1 \end{bmatrix},$$

where R indicates a rotation matrix of the camera, and t indicates a translation matrix of the camera. After the preprocessed image for the first original image, the depth image for the first original image, the preprocessed image for the second original image and the depth image for the second original image are obtained, the pose may be modified based on the preprocessed image for the first original image, the depth image for the first original image, the preprocessed image for the second original image and the depth image for the second original image. The modified pose may be recorded as $$\text{Pose}' = \begin{bmatrix} R' & t' \\ 0 & 1 \end{bmatrix}.$$

According to the embodiments of the present disclosure, the pose is modified as follows.

First, spatial coordinates for each pixel in the preprocessed image for the first original image and spatial coordinates for each pixel in the preprocessed image for the second original image, that is, the point cloud set of the preprocessed image for the first original image and the point cloud set of the preprocessed image for the second original image, are calculated.

Specifically, the point cloud set of the preprocessed image for the first original image may be recorded as $P_t$, and the point cloud set of the preprocessed image for the second original image may be recorded as $P_{t+1}$. Two-dimensional coordinates for the pixel may be transformed into three-dimensional spatial coordinates based on the conversion relationship between the camera and the pixel coordinates. Accordingly, a transformation equation of transforming the pixel in the two-dimensional image into a point in the three-dimensional point cloud may be expressed by Equation 1.

$$P_Z \begin{bmatrix} u \\ v \\ 1 \end{bmatrix} = KP = K \begin{bmatrix} P_X \\ P_Y \\ P_Z \end{bmatrix} \quad \text{Equation 1}$$

where $P_z$ is a depth value of a pixel P, u and v indicate the pixel coordinates, $P_X$, $P_Y$, $P_z$ indicate spatial coordinates for a point mapped from the pixel P into the space, and K is an internal parameter of the camera. Coordinates for each point $P_i$ in the three-dimensional point cloud may be expressed by Equation 2.

$$P_i = \begin{bmatrix} X \\ Y \\ Z \end{bmatrix} = K^{-1} Z \begin{bmatrix} u \\ v \\ 1 \end{bmatrix} \quad \text{Equation 2}$$

Where $K^{-1}$ indicates an inverse matrix of K, and X, Y, Z indicate the spatial coordinates for $P_i$, $$K = \begin{bmatrix} f_x & 0 & c_x \\ 0 & f_y & c_y \\ 0 & 0 & 1 \end{bmatrix},$$

where $f_x$ is a pixel focal length in a direction x, $f_y$ is a pixel focal length in a direction y, and $[c_x, c_y]$ is a main point of the camera, that is, a center of the camera.

Then, the initial pose Pose is modified based on the point cloud set of the preprocessed image for the first original image and the point cloud set of the preprocessed image for the second original image.

Specifically, the point cloud set $P_t$ of the preprocessed image for the first original image and the point cloud set $P_{t+1}$ of the preprocessed image for the second original image are two sets of point clouds obtained by removing the moving objects. The pose is recalculated through the ICP algorithm based on the initial pose Pose and the two sets of point clouds $P_t$ and $P_{t+1}$, so that a modified pose $$Pose' = \begin{bmatrix} R' & t' \\ 0 & 1 \end{bmatrix}$$

is obtained, where R' is a modified rotation matrix, and t' is a modified translation matrix;

The ICP algorithm is an algorithm for estimating a motion between two sets of matched points. The two sets of points may be the point cloud set of the preprocessed image for the first original image and the point cloud set of the preprocessed image for the second original image. The two sets of points may be matched based on a closest distance, so that each point has respective mapping point. Then, the motion estimation is continuously iterated based on each pair of matched points, until the preset cutoff condition is met, so that the modified pose is obtained.

Figure 4:
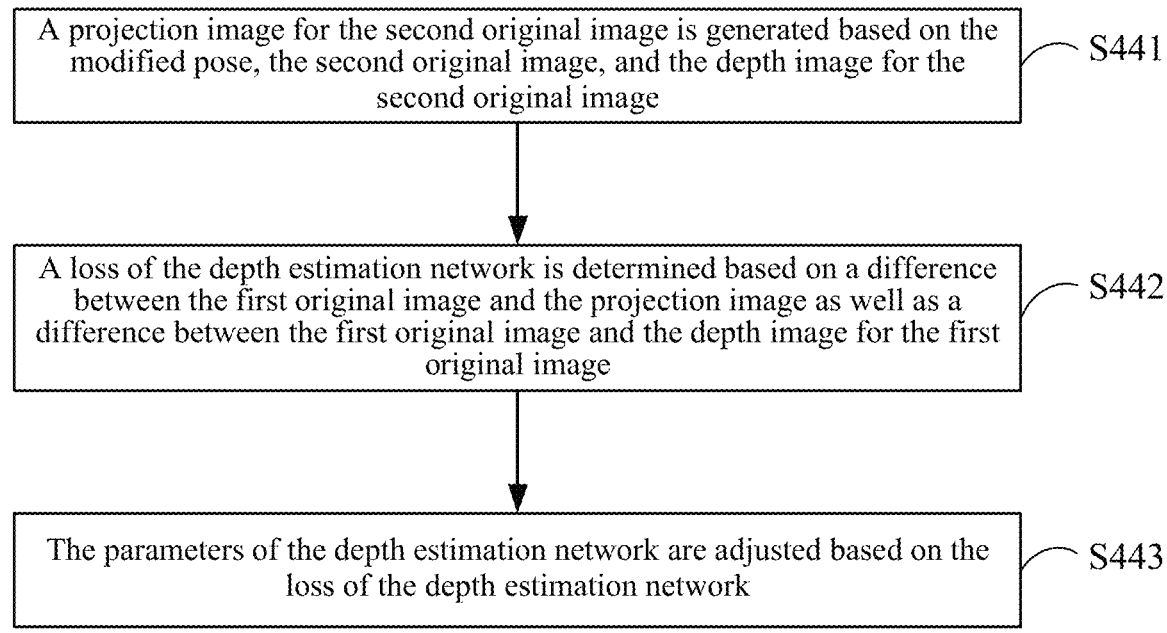
FIG. 4 shows a flowchart of a method of adjusting parameters of a depth estimation network according to an embodiment of the present disclosure.

FIG. 4 shows a flowchart of a method of adjusting parameters of a depth estimation network according to an embodiment of the present disclosure.

As shown in FIG. 4, the method includes operation S441 to operation S443.

In operation S441, a projection image for the second original image is generated based on the modified pose, the second original image, and the depth image for the second original image.

According to the embodiments of the present disclosure, the second original image may be remapped based on the modified pose, the position information for the each pixel in the second original image, and the depth information for each pixel in the depth image for the second original image, so as to obtain a projection image for the second original image.

Specifically, based on the pose between the two frames of images, the next frame of image may be remapped to restore the previous frame of image. Exemplarily, the modified pose is denoted as Pose', the first original image is denoted as $I_t$, the second original image is denoted as $I_{t+1}$, the projection image obtained by remapping the second original image $I_{t+1}$ is denoted as $\hat{I}_t$, each pixel in the second original image $I_{t+1}$ is denoted as $P_{t+1}'$, $P_{t+1}' = [u, v, 1]^T$, the depth information of the second original image is denoted as $Z_{P_{t+1}}'$, and the pixel coordinates for each pixel in the projection image $\hat{I}_t$ are denoted as $\hat{p}_t$, then $\hat{p}_t$ is expressed by Equation 3.

$$\hat{p}_t = K * Pose'* Z_{P_{t+1}}' * K^{-1} * p_{t+1} \qquad \text{Equation 3}$$

In operation S442, a loss of the depth estimation network is determined based on a difference between the first original image and the projection image as well as a difference between the first original image and the depth image for the first original image.

According to the embodiments of the present disclosure, the projection image for the second original image should restore the first original image as much as possible. Therefore, the difference between the projection image and the first original image may be taken as a part of the loss of the depth estimation network. In addition, a gradient of the first original image and that of the depth image for the first original image should be consistent as far as possible. Therefore, the difference between the gradient of the first original image and the gradient of the depth image for the first original image may also be taken as a part of the loss of the depth estimation network.

Specifically, the projection image $\hat{I}_t$ should be as similar to the first original image $I_t$ as possible. A photometric error between the projection image $\hat{I}t$ and the first original image $I_t$ may be defined based on a similarity between the projection image $\hat{I}_t$ and the first original image $I_t$ as well as a grayscale difference between the projection image $\hat{I}_t$ and the first original image $I_t$. The photometric error may be taken as a part of the loss of the depth estimation network. In addition, the depth image for the first original image $I_t$ may be denoted as $D_t$, and the gradient of $I_t$ and the gradient of $D_t$ should be as consistent as possible. The gradient error between the first original image $I_t$ and the depth image $D_t$ for the first original image $I_t$ may be defined based on the difference between the gradient of the first original image $I_t$ and the gradient of the depth image $D_t$ for the first original image $I_t$. The gradient error may be taken as another part of the loss of the depth estimation network.

In operation S443, the parameters of the depth estimation network are adjusted based on the loss of the depth estimation network.

According to the embodiments of the present disclosure, a total loss of the depth estimation network may be calculated based on the photometric error between the projection image $\hat{I}_t$ and the first original image $I_t$ and the gradient error between the first original image $I_t$ and the depth image $D_t$ for the first original image $I_t$. The parameters of the depth estimation network may be adjusted based on the total loss of the depth estimation network. Then, the operation S210 is performed on a further original image and the training process is repeated, until the total loss of the depth estimation network meets a preset cutoff condition. In this way, the trained depth estimation network may be obtained.

According to the embodiments of the present disclosure, the photometric error between the projection image $\hat{I}_t$ and the first original image $I_t$ may be expressed by Equation 4.

$$L_{ph}(I_t, \hat{I}_t) = \alpha \frac{1 - SSIM(I_t, \hat{I}_t)}{2} + (1-\alpha)\|I_t - \hat{I}_t\| \qquad \text{Equation 4}$$

where SSIM (Structural Similarity index) is an index used to measure the similarity of two images, $\alpha$ indicates a weight balance super parameter, and $\|I_t - \hat{I}_t\|$ indicates the grayscale difference between two images.

Figure 5:
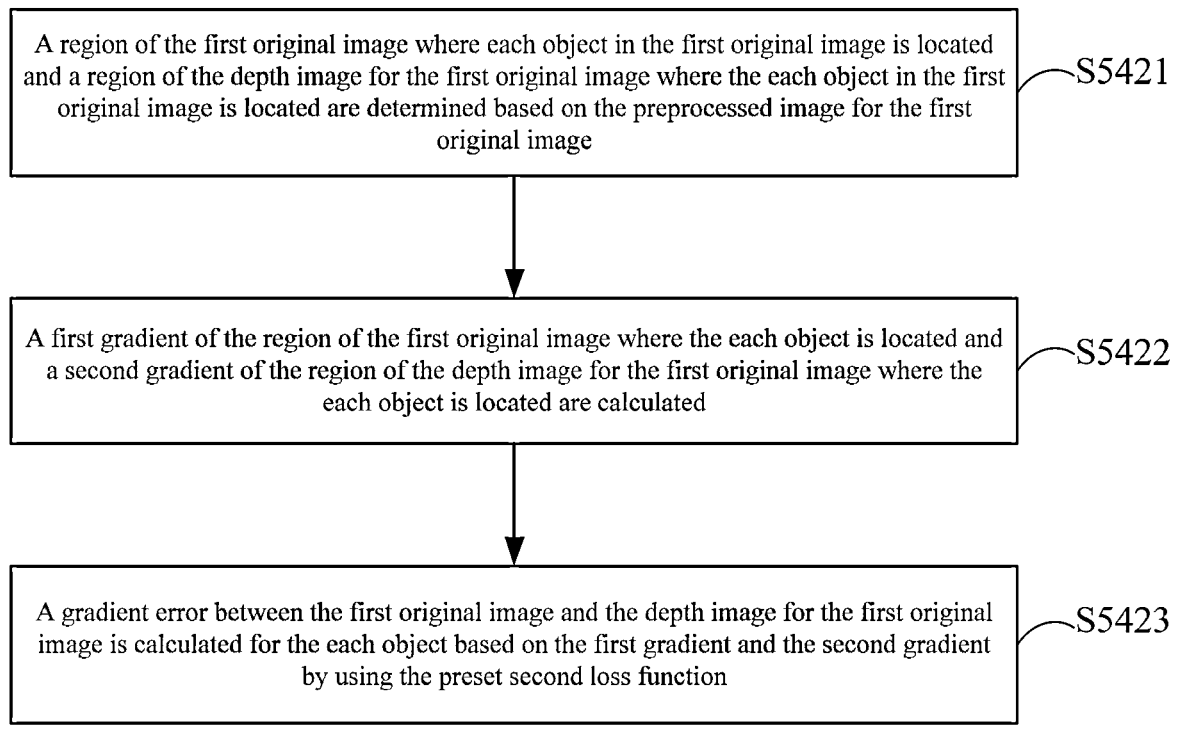
FIG. 5 shows a flowchart of a method of determining a loss of a depth estimation network according to an embodiment of the present disclosure.

FIG. 5 shows a flowchart of a method of determining a loss of a depth estimation network according to an embodiment of the present disclosure.

As shown in FIG. 5, the method includes operation S5421 to operation S5424.

In operation S5421, a region of the first original image where each object in the first original image is located and a region of the depth image for the first original image where the each object in the first original image is located are determined based on the preprocessed image for the first original image.

According to the embodiments of the present disclosure, the preprocessed image for the first original image may be denoted as $Mask_t$. Based on various objects (which may include, for example, static objects such as roads, trees, sky, traffic lights, etc.) in $Mask_t$, it is possible to determine a region of the first original image $I_t$ where these static objects are located, and a region of the depth image $D_t$ for the first original image where these static objects are located.

In operation S5422, a first gradient of the region of the first original image where the each object is located and a second gradient of the region of the depth image for the first original image where the each object is located are calculated.

According to the embodiments of the present disclosure, the gradient of the region of the first original image $I_t$ where the each object is located (denoted as a first gradient) and the gradient of the region of the depth image $D_t$ for the first original image may be calculated using information of the segmented regions.

In operation S5423, a gradient error between the first original image and the depth image for the first original image is calculated for the each object based on the first gradient and the second gradient by using the preset second loss function.

According to the embodiments of the present disclosure, the gradient error between the region of $I_t$ where the each object is located and the region of $D_t$ where the each object is located is calculated based on the first gradient of the each object and the second gradient of the each object. It may be understood that the depth of the same object in the depth image $D_t$ for the first original image should be smooth. A depth smoothness of the region of $D_t$ where the same object is located is defined based on the gradient error between the region of $I_t$ where the same object is located and the region of $D_t$ where the same object is located. The depth smoothness of the region where the same object is located may be restricted to punish a case of large depth jump.

For the same object m, the gradient error between the first original image $I_t$ and the depth image $D_t$ for the first original image may be calculated for the object m by Equation 5.

$$L_{smooth}(D_t) = \Sigma_j |\nabla D_t(j)| e^{-|\nabla I_t(j)|}, \text{ for } j \in S \qquad \text{Equation 5}$$

where $\nabla D_t(j)$ indicates the gradient of the region of the first original image $I_t$ where the object m is located, $\nabla I_t(j)$ indicates the gradient of the region of the depth image $D_t$ for the first original image where the object m is located, and S indicates a set of pixels in the region of the first original image where the object m is located, which may also be referred to as a set of pixels in the region of the depth image $D_t$ for the first original image.

According to the embodiments of the present disclosure, learning of the depth estimation network should be performed so that the depth of the region of the first depth image $D_t$ where the same object is located as smooth as possible. The depth smoothness of the region of the first depth image $D_t$ where the same object is located may be defined based on the difference between the gradient of the first original image $I_t$ and the gradient of the first depth image $D_t$ for the first original image $I_t$. Therefore, the gradient error between the first original image $I_t$ and the first depth image $D_t$ may be taken as a part of the loss of the depth estimation network.

By restricting the continuity of the depth of the region of the depth image where the same object is located, the depth estimation network trained may estimate the depth information with higher robustness.

In operation S5424, a total gradient error between the first original image and the depth image for the first original image is calculated based on the gradient error for the each object.

According to the embodiments of the present disclosure, the total gradient error may be calculated based on the gradient error for the each object m. For example, a sum of the gradient errors for each object m may be taken as the total gradient error.

According to the embodiments of the present disclosure, the total loss of the depth estimation network may be calculated based on the photometric error $L_{ph}(I_t, \hat{I}_t)$ and the gradient error $L_{smooth}(D_t)$. For example, the total loss of the depth estimation network may be expressed by Equation 6.

$$L = L_{ph}(I_t, \hat{I}_t) + L_{smooth}(D_t) \qquad \text{Equation 6}$$

According to the embodiments of the present disclosure, in a case that the total loss L of the depth estimation network does not meet the preset condition (such as convergence), the parameters of the depth estimation network may be adjusted. The above training process may be repeated using the depth estimation network with adjusted parameters, until the loss L meets the preset condition.

According to the embodiments of the present disclosure, in a case that the total loss L of the depth estimation network does not meet the preset condition, the parameters of the pose estimation network may also be adjusted. That is, the depth estimation network and the pose estimation network are updated at the same time. The above training process may be repeated using the updated depth estimation network and the updated pose estimation network, until the loss L meets the preset condition. In this way, the depth estimation network and the pose estimation network may be trained at the same time, so as to obtain a trained depth estimation network and a trained pose estimation network.

Figure 6:
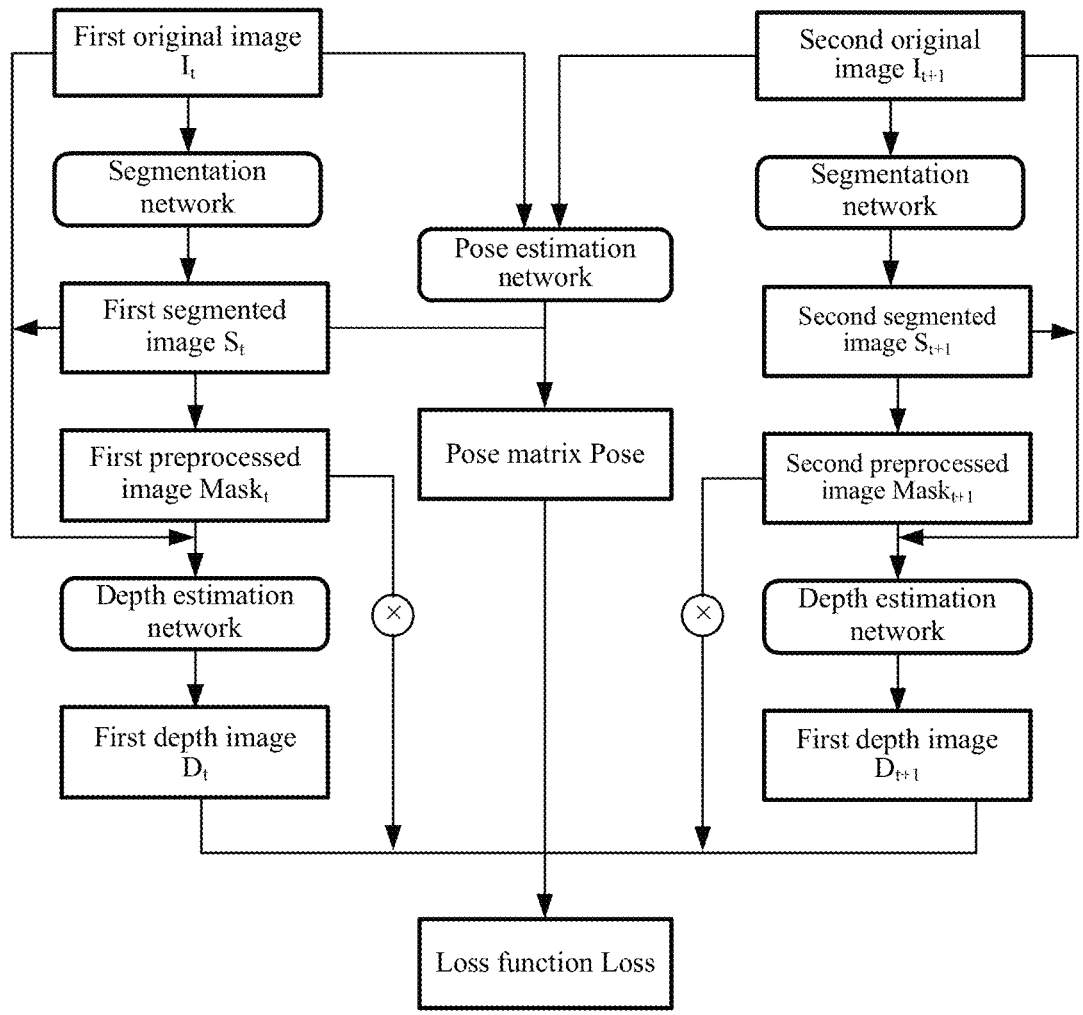
FIG. 6 shows a flowchart of a method of training a depth estimation network according to an embodiment of the present disclosure.

FIG. 6 shows a flowchart of a method of training a depth estimation network according to an embodiment of the present disclosure.

As shown in FIG. 6, the first original image is denoted as $I_t$, and the second original image is denoted as $I_{t+1}$, where t indicates a current frame, and t+1 indicates a next frame to the current frame. The segmented image for the first original image is recorded as a first segmented image $S_t$, and the segmented image for the second original image is recorded as a second segmented image $S_{t+1}$. The preprocessed image for the first original image is recorded as a first preprocessed image $Mask_t$, and the preprocessed image for the second original image is recorded as a second preprocessed image $Mask_{t+1}$. The depth image for the first original image is recorded as a first depth image $D_t$, and a depth image for the second original image is recorded as a second depth image $D_{t+1}$.

According to the embodiments of the present disclosure, the first original image $I_t$ and the second original image $I_{t+1}$ are input to the segmentation network, and the segmentation network outputs the first segmented image $S_t$ and the second segmented image $S_{t+1}$. The segmentation network may be a semantic segmentation network, which is used to segment different semantic objects. The semantic objects in an image scene may include roads, trees, pedestrians and vehicles, etc. The semantic segmentation network may segment different semantic objects such as roads, trees, pedestrians and vehicles into different regions, so as to obtain the first segmented image $S_t$ and the second segmented image $S_{t+1}$.

According to the embodiments of the present disclosure, the moving object (such as a pedestrian and a vehicle) in the first segmented image $S_t$ and the moving object in the second segmented image $S_{t+1}$ are removed, so as to obtain the first preprocessed image $Mask_t$ containing only static objects (such as roads and trees) and the second preprocessed image $Mask_{t+1}$ containing only static objects.

According to the embodiments of the present disclosure, the first original image $I_t$ and the first segmented image $S_t$ are combined and input to the depth estimation network, and the second original image $I_{t+1}$ and the second segmented image $S_{t+1}$ are combined and input to the depth estimation network. The depth estimation network outputs the first depth image $D_t$ and the second depth image $D_{t+1}$.

According to the embodiments of the present disclosure, the first original image $I_t$ and the second original image $I_{t+1}$ are input to the pose estimation network, and the pose estimation network outputs an initial pose matrix Pose between the first original image $I_t$ and the second original image $I_{t+1}$.

According to the embodiments of the present disclosure, each pixel in the first preprocessed image $Mask_t$ is mapped into the three-dimensional space through the conversion relationship between the camera and the pixel coordinates, according to the position information for the each pixel in the first preprocessed image $Mask_t$ and the depth information for each pixel in the first depth image $D_t$, so as to obtain a three-dimensional spatial point cloud set $P_t$ for the first preprocessed image $Mask_t$. Similarly, each pixel in the second preprocessed image $Mask_t$ is mapped into the three-dimensional space to obtain a three-dimensional space point cloud set $P_{t+1}$ for the second preprocessed image $Mask_{t+1}$. The pose is recalculated based on the initial pose matrix Pose, the point cloud set $P_t$ and the point cloud set $P_{t+1}$, so as to obtain an updated pose matrix Pose'.

According to the embodiments of the present disclosure, the second original image $I_{t+1}$ may be remapped into the projection image $\hat{I}_t$ based on the updated pose matrix Pose'. Specifically, the position information for each pixel in the projection image $\hat{I}_t$ mapped from each pixel in the second original image $I_{t+1}$ may be calculated based on the updated pose matrix Pose', the position information for each pixel in the second original image $I_{t+1}$, and the depth information for each pixel in the second depth image $D_{t+1}$.

According to the embodiments of the present disclosure, learning of the depth estimation network should be performed so that the first original image $I_t$ is as similar to the projection image $\hat{I}_t$ as possible. The photometric error between the first original image $I_t$ and the projection image $\hat{I}_t$ may be calculated based on a structural similarity between the first original image $I_t$ and the projection image $\hat{I}_t$ as well as a grayscale difference between the first original image $I_t$ and the projection image $\hat{I}_t$. The photometric error is taken as a part of the loss of the depth estimation network.

According to the embodiments of the present disclosure, learning of the depth estimation network should be performed so that the depth of the region of the first depth image $D_t$ where the same object is located is as smooth as possible. The depth smoothness of the region of the first depth image $D_t$ where the same object is located may be defined based on the difference between the gradient of the first original image $I_t$ and the gradient of the first depth image $D_t$ for the first original image $I_t$. Therefore, the gradient error between the first original image $I_t$ and the first depth image $D_t$ may be taken as a part of the loss of the depth estimation network.

By restricting the continuity of the depth of the region of the depth image where the same object is located, the depth estimation network trained may estimate the depth information with higher robustness.

According to the embodiments of the present disclosure, a sum of the photometric error and the gradient error is taken as a total loss Loss. The parameters of the depth estimation network may be adjusted based on the total loss Loss. Then, the above steps are repeatedly performed on a further original image by using the depth estimation network with adjusted parameters, until the total loss Loss converges. It may be understood that the parameters of the pose estimation network may be adjusted based on the total loss Loss. Then, the above steps are repeatedly performed using the pose estimation network with adjusted parameters, until the total loss Loss converges.

Figure 7:
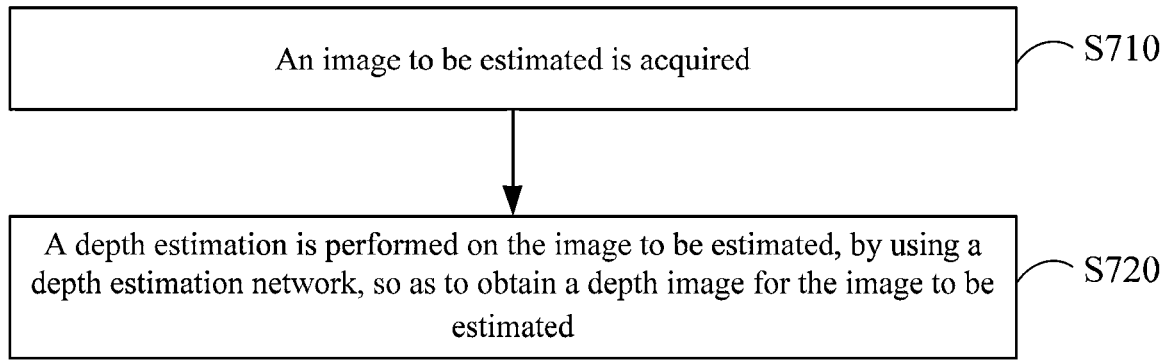
FIG. 7 shows a flowchart of a method of estimating a depth of an image according to an embodiment of the present disclosure.

FIG. 7 shows a flowchart of a method of estimating a depth of an image according to an embodiment of the present disclosure.

As shown in FIG. 7, a method 700 of estimating a depth of an image may include operation S710 to operation S720.

In operation S710, an image to be estimated is acquired.

In operation S720, a depth estimation is performed on the image to be estimated, by using a depth estimation network, so as to obtain a depth image for the image to be estimated.

According to the embodiments of the present disclosure, the depth estimation network trained by the method described above may perform the depth estimation on the image. Specifically, the depth image for the image to be estimated may be output after the image to be estimated is input into the trained depth estimation network. Because the moving object is removed in the above training method, a more accurate pose may be obtained, so that the training accuracy of the depth estimation network may be improved. Moreover, the above training method restricts the depth continuity of the region of the depth image where the same object is located, so that the trained depth estimation network may estimate the depth information with higher robustness.

Figure 8:
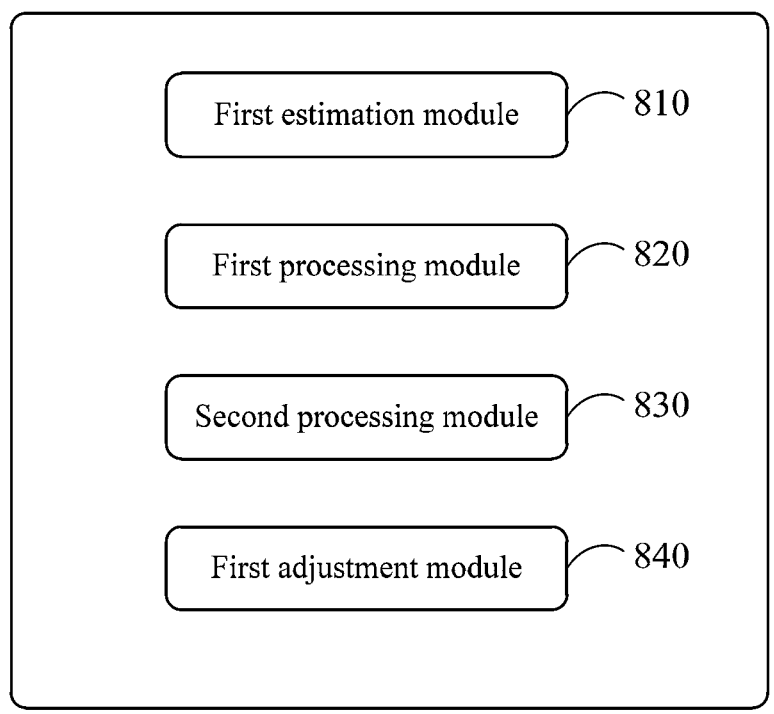
FIG. 8 shows a block diagram of an apparatus of training a depth estimation network according to an embodiment of the present disclosure.

FIG. 8 shows a block diagram of an apparatus of training a depth estimation network according to an embodiment of the present disclosure.

As shown in FIG. 8, an apparatus 800 of training a depth estimation network may include a first estimation module 810, a first processing module 820, a second processing module 830 and a first adjustment module 840.

The first estimation module 810 is used to perform a depth estimation on an original image by using a depth estimation network, so as to obtain a depth image for the original image.

The first processing module 820 is used to remove a moving object from the original image so as to obtain a preprocessed image for the original image.

The second processing module 830 is used to estimate a pose based on the original image and modify the pose based on the preprocessed image.

The first adjustment module 840 is used to adjust parameters of the depth estimation network according to the original image, the depth image and the pose modified.

According to the embodiments of the present disclosure, the first processing module 820 includes a segmentation unit and a processing unit.

The segmentation unit is used to segment the first original image and the second original image so as to obtain a segmented image for the first original image and a segmented image for the second original image. The segmented image for the first original image and the segmented image for the second original image each contain a plurality of objects.

The processing unit is used to remove a moving object of the plurality of objects from the segmented image for the first original image and remove a moving object of the plurality of objects from the segmented image for the second original image, so as to obtain a preprocessed image for the first original image and a preprocessed image for the second original image.

According to the embodiments of the present disclosure, the first estimation module 810 includes a first estimation unit and a second estimation unit.

The first estimation unit is used to perform a depth estimation on the first original image based on the first original image and the segmented image for the first original image by using the depth estimation network, so as to obtain a depth image for the first original image.

The second estimation unit is used to perform a depth estimation on the second original image based on the second original image and the segmented image for the second original image by using the depth estimation network, so as to obtain a depth image for the second original image.

According to the embodiments of the present disclosure, the second processing module 830 includes a third estimation unit and a modification unit.

The third estimation unit is used to estimate a pose between the first original image and the second original image by using a pose estimation network;

The modification unit is used to modify the pose based on the preprocessed image for the first original image, the depth image for the first original image, the preprocessed image for the second original image, and the depth image for the second original image.

According to the embodiments of the present application, the modification unit includes a first calculation sub-unit, a second calculation sub-unit and a modification sub-unit.

The first calculation sub-unit is used to calculate a spatial coordinate information for each pixel in the preprocessed image for the first original image, based on a position information for the each pixel in the preprocessed image for the first original image and a depth information of the depth image for the first original image.

The second calculation sub-unit is used to calculate a spatial coordinate information for each pixel in the preprocessed image for the second original image, based on a position information for the each pixel in the preprocessed image for the second original image and a depth information of the depth image for the second original image.

The modification sub-unit is used to modify the pose based on the spatial coordinate information for the each pixel in the preprocessed image for the first original image and the spatial coordinate information for the each pixel in the preprocessed image for the second original image.

According to the embodiments of the present disclosure, the first adjustment module 840 includes a generation unit, a determination unit and an adjustment unit.

The generation unit is used to generate a projection image for the second original image based on the pose modified, the second original image, and the depth image for the second original image.

The determination unit is used to determine a loss of the depth estimation network based on a difference between the first original image and the projection image as well as a difference between the first original image and the depth image for the first original image.

The adjustment unit is used to adjust the parameters of the depth estimation network based on the loss of the depth estimation network.

According to the embodiments of the present disclosure, the generation unit includes a third calculation sub-unit and a generation sub-unit.

The third calculation sub-unit is used to calculate a projection position information for each pixel in the second original image based on the pose modified, the position information for the each pixel in the second original image, and a depth information for each pixel in the depth image for the second original image.

The generation sub-unit is used to generate the projection image based on the projection position information for the each pixel in the second original image.

According to the embodiments of the present application, the determination unit includes a fourth calculation sub-unit, a fifth calculation sub-unit and a sixth calculation sub-unit.

The fourth calculation sub-unit is used to calculate a photometric error between the first original image and the projection image by using a preset first loss function.

The fifth calculation sub-unit is used to calculate a gradient error between the first original image and the depth information for the first original image by using a preset second loss function.

The sixth calculation sub-unit is used to calculate the loss of the depth estimation network based on the photometric error and the gradient error.

According to the embodiments of the present disclosure, the fifth calculation sub-unit is used to: determine a region of the first original image where each object in the first original image is located and a region of the depth image for the first original image where the each object in the first original image is located, based on the preprocessed image for the first original image; calculate a first gradient of the region of the first original image where the each object is located and a second gradient of the region of the depth image for the first original image where the each object is located; calculate a gradient error between the first original image and the depth image for the first original image for the each object based on the first gradient and the second gradient by using the preset second loss function; and calculate a total gradient error between the first original image and the depth image for the first original image based on the gradient error for the each object.

According to the embodiments of the present disclosure, the first adjustment module 840 is used to adjust the parameters of the depth estimation network and perform the depth estimation on a further original image by using the depth estimation network, in response to determining that the loss of the depth estimation network does not meet a preset condition.

According to the embodiments of the present disclosure, the apparatus 800 of training the depth estimation network further includes a second adjustment module.

The second adjustment module is used to adjust parameters of the pose estimation network according to the original image, the depth image and the pose modified.

Figure 9:
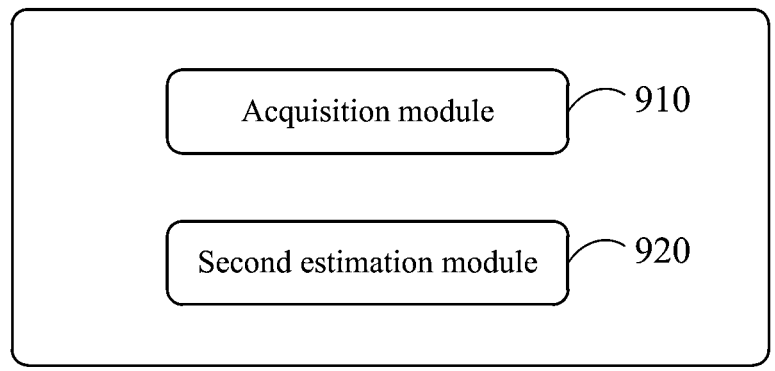
FIG. 9 shows a block diagram of an apparatus of estimating a depth of an image according to an embodiment of the present disclosure.

FIG. 9 shows a block diagram of an apparatus of estimating a depth of an image according to an embodiment of the present disclosure.

As shown in FIG. 9, an apparatus 900 of estimating a depth of an image may include an acquisition module 910 and a second estimation module 920.

The acquisition module 910 is used to acquire an image to be estimated.

The second estimation module 920 is used to perform a depth estimation on the image to be estimated, by using a depth estimation network, so as to obtain a depth image for the image to be estimated.

According to the embodiments of the present disclosure, the present disclosure further provides an electronic device, a readable storage medium, and a computer program product. The computer program product may contain computer programs that, when executed by a processor, cause the processor to implement the method provided by the present disclosure.

Figure 10:
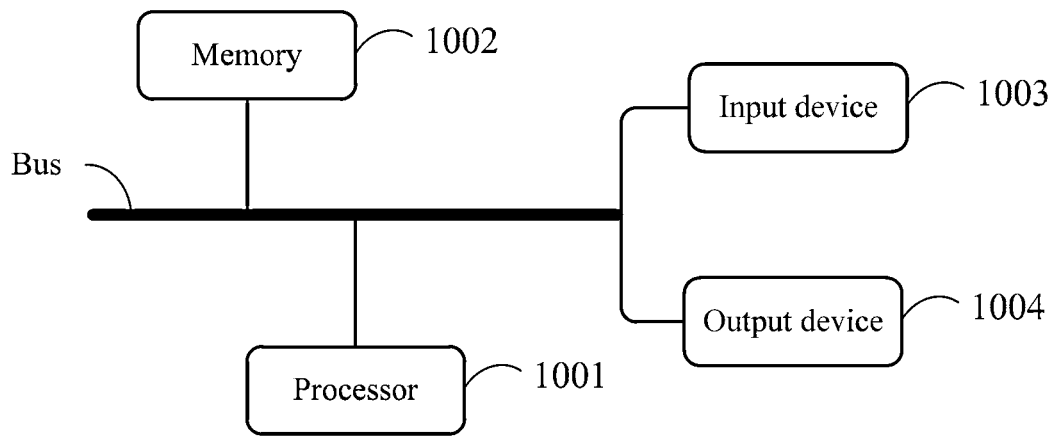
FIG. 10 shows a block diagram of an electronic device for implementing a method of training a depth estimation network according to an embodiment of the present disclosure.

FIG. 10 shows a block diagram of an electronic device for implementing the method of training the depth estimation network according to the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 10, an electronic device 1000 may include one or more processors 1001, a memory 1002, and interface(s) for connecting various components, including high-speed interface(s) and low-speed interface(s). The various components are connected to each other by using different buses, and may be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other embodiments, a plurality of processors and/or a plurality of buses may be used with a plurality of memories, if necessary. Similarly, a plurality of electronic devices may be connected in such a manner that each device providing a part of necessary operations (for example, as a server array, a group of blade servers, or a multi-processor system). In FIG. 10, a processor 1001 is illustrated by way of example.

The memory 1002 is a non-transitory computer-readable storage medium provided by the present disclosure. The memory stores instructions executable by at least one processor, to cause the at least one processor to perform the method of training the depth estimation network provided in the present disclosure. The non-transitory computer-readable storage medium of the present disclosure stores computer instructions for allowing a computer to execute the method of training the depth estimation network provided in the present disclosure.

The memory 1002, as a non-transitory computer-readable storage medium, may be used to store non-transitory software programs, non-transitory computer-executable programs and modules, such as program instructions/modules corresponding to the method of training the depth estimation network in the embodiments of the present disclosure (for example, the first estimation module 810, the first processing module 820, the second processing module 830 and the first adjustment module 840 shown in FIG. 8). The processor 1001 executes various functional applications and data processing of the server by executing the non-transient software programs, instructions and modules stored in the memory 1002, thereby implementing the method of training the depth estimation network in the embodiments of the method mentioned above.

The memory 1002 may include a program storage area and a data storage area. The program storage area may store an operating system and an application program required by at least one function. The data storage area may store data etc. generated by using the electronic device 1000 according to the method of training the depth estimation network. In addition, the memory 1002 may include a high-speed random access memory, and may further include a non-transitory memory, such as at least one magnetic disk storage device, a flash memory device, or other non-transitory solid-state storage devices. In some embodiments, the memory 1002 may optionally include a memory provided remotely with respect to the processor 1001, and such remote memory may be connected through a network to the electronic device 1000 for implementing the method of training the depth estimation network. Examples of the above-mentioned network include, but are not limited to the Internet, intranet, local area network, mobile communication network, and combination thereof.

The electronic device 1000 for implementing the method of training the depth estimation network may further include an input device 1003 and an output device 1004. The processor 1001, the memory 1002, the input device 1003 and the output device 1004 may be connected by a bus or in other manners. In FIG. 10, the connection by a bus is illustrated by way of example.

The input device 1003 may receive input information of numbers or character, and generate key input signals related to user settings and function control of the electronic device 1000 for implementing the method of training the depth estimation network, such as a touch screen, a keypad, a mouse, a track pad, a touchpad, a pointing stick, one or more mouse buttons, a trackball, a joystick, and so on. The output device 1004 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, an application specific integrated circuit (ASIC), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

These computing programs (also referred as programs, software, software applications, or codes) include machine instructions for a programmable processor, and may be implemented using high-level programming languages, object-oriented programming languages, and/or assembly/machine languages. As used herein, the terms "machine-readable medium" and "computer-readable medium" refer to any computer program product, apparatus and/or device (for example, magnetic disk, optical disk, memory, programmable logic device (PLD)) for providing machine instructions and/or data to a programmable processor, including a machine-readable medium for receiving machine instructions as machine-readable signals. The term "machine-readable signal" refers to any signal for providing machine instructions and/or data to a programmable processor.

In order to provide interaction with the user, the systems and technologies described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other.

According to the embodiments of the present disclosure, the depth estimation is performed on the original image by using the depth estimation network so as to obtain the depth image for the original image, the moving object is removed from the original image to obtain the preprocessed image for the original image, the pose is estimated based on the original image and is modified based on the preprocessed image, and the parameters of the depth estimation network are adjusted based on the original image, the depth image and the pose modified. Because the moving object is removed from the original image, the influence of the moving object on the network training may be reduced, so that the accuracy of the network training may be improved.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the protection scope of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training a depth estimation network, comprising:
performing a depth estimation on an original image by using a depth estimation network, so as to obtain a depth image for the original image;
removing a moving object from the original image so as to obtain a preprocessed image for the original image;
estimating a pose based on the original image and modifying the pose based on the preprocessed image; and
adjusting parameters of the depth estimation network according to the original image, the depth image and the pose modified,
wherein the original image comprises a first original image and a second original image located in a frame adjacent to the first original image,
wherein the adjusting parameters of the depth estimation network according to the original image, the depth image and the pose modified comprises: generating a projection image for the second original image based on the pose modified, the second original image, and the depth image for the second original image; determining a loss of the depth estimation network based on a photometric error between the first original image and the projection image as well as a gradient error between the first original image and the depth image for the first original image; and adjusting the parameters of the depth estimation network based on the loss of the depth estimation network;
wherein the photometric error is calculated by using a preset first loss function;
wherein the gradient error is obtained by following operations that include: determining a region of the first original image where each object in the first original image is located and a region of the depth image for the first original image where the each object in the first original image is located, based on the preprocessed image for the first original image; calculating a first gradient of the region of the first original image where the each object is located and a second gradient of the region of the depth image for the first original image where the each object is located; calculating, for the each object, a gradient error between the first original image and the depth image for the first original image based on the first gradient and the second gradient by using a preset second loss function; and calculating a total gradient error between the first original image and the depth image for the first original image based on the gradient error for the each object.

2. The method of claim 1, wherein the removing a moving object from the original image comprises:
segmenting the first original image and the second original image by using a segmentation network so as to obtain a segmented image for the first original image and a segmented image for the second original image, wherein each of the segmented image for the first original image and the segmented image for the second original image contains a plurality of objects; and
removing moving objects of the plurality of objects respectively from the segmented image for the first original image and the segmented image for the second original image, so as to obtain a preprocessed image for the first original image and a preprocessed image for the second original image.

3. The method of claim 2, wherein the performing a depth estimation on an original image by using a depth estimation network, so as to obtain a depth image for the original image comprises:
performing a depth estimation on the first original image based on the first original image and the segmented image for the first original image by using the depth estimation network, so as to obtain a depth image for the first original image; and
performing a depth estimation on the second original image based on the second original image and the segmented image for the second original image by using the depth estimation network, so as to obtain a depth image for the second original image.

4. The method of claim 3, wherein the estimating a pose based on the original image and modifying the pose based on the preprocessed image comprises:
estimating a pose between the first original image and the second original image by using a pose estimation network; and
modifying the pose based on the preprocessed image for the first original image, the depth image for the first original image, the preprocessed image for the second original image, and the depth image for the second original image.

5. The method of claim 4, wherein the modifying the pose based on the preprocessed image for the first original image, the depth image for the first original image, the preprocessed image for the second original image, and the depth image for the second original image comprises:
calculating a spatial coordinate information for each pixel in the preprocessed image for the first original image, based on a position information for the each pixel in the preprocessed image for the first original image and a depth information of the depth image for the first original image;
calculating a spatial coordinate information for each pixel in the preprocessed image for the second original image, based on a position information for the each pixel in the preprocessed image for the second original image and a depth information of the depth image for the second original image; and
modifying the pose based on the spatial coordinate information for the each pixel in the preprocessed image for the first original image and the spatial coordinate information for the each pixel in the preprocessed image for the second original image.

6. The method of claim 1, wherein the generating a projection image for the second original image based on the pose modified, the second original image, and the depth image for the second original image comprises:
calculating a projection position information for each pixel in the second original image based on the pose modified, the position information for the each pixel in the second original image, and a depth information for each pixel in the depth image for the second original image; and
generating the projection image based on the projection position information for the each pixel in the second original image.

7. The method of claim 1, wherein the adjusting the parameters of the depth estimation network based on the loss of the depth estimation network comprises:

adjusting the parameters of the depth estimation network and performing the depth estimation on a further original image by using the depth estimation network, in response to determining that the loss of the depth estimation network does not meet a preset condition.

8. The method of claim 4, further comprising:
adjusting parameters of the pose estimation network according to the original image, the depth image and the pose modified.

9. A method of estimating a depth of an image, comprising:
acquiring an image to be estimated; and
performing a depth estimation on the image to be estimated, by using a depth estimation network, so as to obtain a depth image for the image to be estimated, wherein the depth estimation network is trained by using operations of training a depth estimation network, the operations comprise:
performing a depth estimation on an original image by using a depth estimation network, so as to obtain a depth image for the original image;
removing a moving object from the original image so as to obtain a preprocessed image for the original image;
estimating a pose based on the original image and modifying the pose based on the preprocessed image; and
adjusting parameters of the depth estimation network according to the original image, the depth image and the pose modified,
wherein the original image comprises a first original image and a second original image located in a frame adjacent to the first original image,
wherein the adjusting parameters of the depth estimation network according to the original image, the depth image and the pose modified comprises: generating a projection image for the second original image based on the pose modified, the second original image, and the depth image for the second original image; determining a loss of the depth estimation network based on a photometric error between the first original image and the projection image as well as a gradient error between the first original image and the depth image for the first original image; and adjusting the parameters of the depth estimation network based on the loss of the depth estimation network;
wherein the photometric error is calculated by using a preset first loss function;
wherein the gradient error is obtained by following operations that include: determining a region of the first original image where each object in the first original image is located and a region of the depth image for the first original image where the each object in the first original image is located, based on the preprocessed image for the first original image; calculating a first gradient of the region of the first original image where the each object is located and a second gradient of the region of the depth image for the first original image where the each object is located; calculating, for the each object, a gradient error between the first original image and the depth image for the first original image based on the first gradient and the second gradient by using a preset second loss function; and calculating a total gradient error between the first original image and the depth image for the first original image based on the gradient error for the each object.

10. An electronic device, comprising:

at least one processor; and a memory communicatively connected to the at least one processor, wherein the memory stores instructions executable by the at least one processor, and the instructions, when executed by the at least one processor, cause the at least one processor to implement operations of training a depth estimation network, comprising:

performing a depth estimation on an original image by using a depth estimation network, so as to obtain a depth image for the original image;

removing a moving object from the original image so as to obtain a preprocessed image for the original image;

estimating a pose based on the original image and modifying the pose based on the preprocessed image; and adjusting parameters of the depth estimation network according to the original image, the depth image and the pose modified, wherein the original image comprises a first original image and a second original image located in a frame adjacent to the first original image, wherein the adjusting parameters of the depth estimation network according to the original image, the depth image and the pose modified comprises: generating a projection image for the second original image based on the pose modified, the second original image, and the depth image for the second original image; determining a loss of the depth estimation network based on a photometric error between the first original image and the projection image as well as a gradient error between the first original image and the depth image for the first original image; and adjusting the parameters of the depth estimation network based on the loss of the depth estimation network;

wherein the photometric error is calculated by using a preset first loss function;

wherein the gradient error is obtained by following operations that include: determining a region of the first original image where each object in the first original image is located and a region of the depth image for the first original image where the each object in the first original image is located, based on the preprocessed image for the first original image; calculating a first gradient of the region of the first original image where the each object is located and a second gradient of the region of the depth image for the first original image where the each object is located; calculating, for the each object, a gradient error between the first original image and the depth image for the first original image based on the first gradient and the second gradient by using a preset second loss function; and calculating a total gradient error between the first original image and the depth image for the first original image based on the gradient error for the each object.

11. An electronic device, comprising:

at least one processor; and a memory communicatively connected to the at least one processor, wherein the memory stores instructions executable by the at least one processor, and the instructions, when executed by the at least one processor, cause the at least one processor to implement the method of claim 9.

12. A non-transitory computer-readable storage medium having computer instructions stored thereon, wherein the computer instructions allow a computer to implement the method of claim 1.

13. A non-transitory computer-readable storage medium having computer instructions stored thereon, wherein the computer instructions allow a computer to implement the method of claim 9.

* * * * *